US012627998B2

(12) United States Patent
Bhamri et al.

(10) Patent No.: US 12,627,998 B2
(45) Date of Patent: May 12, 2026

(54) METHODS AND DEVICES FOR BEAM DIRECTIVITY AT NETWORK-CONTROLLED REPEATERS

(71) Applicant: Apple Inc., Cupertino, CA (US)

(72) Inventors: Ankit Bhamri, Bad Nauheim (DE); Hong He, San Jose, CA (US); Wei Zeng, Saratoga, CA (US); Sigen Ye, San Diego, CA (US); Haitong Sun, Cupertino, CA (US); Huaning Niu, San Jose, CA (US); Dawei Zhang, Saratoga, CA (US); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 718 days.

(21) Appl. No.: 17/882,989

(22) Filed: Aug. 8, 2022

(65) Prior Publication Data

US 2024/0048999 A1 Feb. 8, 2024

(51) Int. Cl.
H04W 16/26 (2009.01)
H04W 16/28 (2009.01)
H04W 72/23 (2023.01)

(52) U.S. Cl.
CPC ........... H04W 16/26 (2013.01); H04W 16/28 (2013.01); H04W 72/23 (2023.01)

(58) Field of Classification Search
CPC ..... H04W 16/28; H04W 72/23; H04W 16/26; H04W 84/04; H04W 84/047
See application file for complete search history.

(56) References Cited

U.S. PATENT DOCUMENTS

| | | | | |
|---|---|---|---|---|
| 6,421,542 B1* | 7/2002 | Sandler | ................. | H04W 16/12 |
| | | | | 455/562.1 |
| 2019/0181943 A1* | 6/2019 | Liang | ................... | H04B 7/2606 |
| 2021/0167844 A1 | 6/2021 | Fang | | |
| 2022/0053486 A1* | 2/2022 | Abedini | ............. | H04B 7/15542 |
| 2022/0061056 A1* | 2/2022 | Farag | ................... | H04W 16/28 |
| 2023/0026516 A1* | 1/2023 | Luo | .................... | H04B 7/15535 |

(Continued)

OTHER PUBLICATIONS

Search Report and the Written Opinion dated Mar. 18, 2024 in connection with Application Serial No. PCT/US2023/029683.

(Continued)

*Primary Examiner* — James P Duffy
(74) *Attorney, Agent, or Firm* — Eschweiler & Potashnik, LLC

(57) ABSTRACT

The present disclosure is related to techniques for configuring a repeater device by control signaling in a wireless communications system. In some embodiments, a repeater device is configured to form separate coverage regions. For example, the repeater device determines a first coverage region based on a first beam at the repeater device paired with a network device, wherein the first coverage region corresponds to a direction such that the first beam falls within the first coverage region for serving a control link or a backhaul link between the repeater device and the network device. Based on a first indication, the repeater device determines one or more coverage regions with respect to the first coverage region, wherein the one or more coverage regions are configured to communicate with a user equipment via an access link of the repeater device.

28 Claims, 8 Drawing Sheets

(56)                References Cited

U.S. PATENT DOCUMENTS

| | | | |
|---|---|---|---|
| 2023/0027215 A1* | 1/2023 | Nilsson | H04B 7/0695 |
| 2023/0327735 A1* | 10/2023 | Awadin | H04W 72/0446 |
| 2023/0403066 A1* | 12/2023 | Horn | H04B 7/0628 |
| 2024/0364414 A1* | 10/2024 | Wanuga | H04L 5/0094 |

OTHER PUBLICATIONS

Qualcomm Incorporated; "Discussion on Relay Synchronization"; 3GPP Draft; R4-101302; vol. RAN WG4; Apr. 9, 2010.

Vivo; "Discussion on side control information to enable NR network-controlled repeaters"; 3GPP Draft; R1-2203578; vol. Ran WG1; Apr. 29, 2022.

CMCC; "Discussion on side control information to enable NR network-controlled repeaters"; 3GPP Draft; R1-2204321; vol. RAN WG1; Apr. 29, 2022.

Apple Inc; Potential Side Control Information for NW-Controlled Repeater; 3GPP Draft; R1-2204258; vol. RAN WG1; Apr. 29, 2022.

Zte; "Discussion on L1/L2 signaling for side control information"; 3GPP; R1-2203238; vol. RAN WG1; Apr. 29, 2022.

International Preliminary Report on Patentability dated Feb. 4, 2025 in connection with Application No. PCT/US2023/029683.

* cited by examiner

Base Station 301

Repeater Device 303

Determine access link beamforming 631

Third indication 633

Determine and direct indicated access link beams 635

700

Assign a first index to the first coverage region 701

Assign indices to other coverage regions 703

800

Determine a first coverage region based on a first beam 801

Form one or more coverage regions with respect to the first coverage region 803

900

Determine a first coverage region of a repeater device based on a first beam 901

Provide, to the repeater device, a first indication of a number coverage regions 903

METHODS AND DEVICES FOR BEAM DIRECTIVITY AT NETWORK-CONTROLLED REPEATERS

TECHNICAL FIELD

This application relates generally to wireless communication systems, including wireless communication systems with a repeater device which is controlled by another device.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

SUMMARY

In accordance with a first aspect, a repeater device including one or more antennas, a transceiver, and a processor is disclosed. In some embodiments, the processor is configured to cause the repeater device to: determine a first coverage region based on a first beam at the repeater device paired with a network device, wherein the first coverage region corresponds to a direction such that the first beam falls within the first coverage region for serving a control link or a backhaul link between the repeater device and the network device; and based on a first indication, determine one or more coverage regions with respect to the first coverage region, wherein the one or more coverage regions are configured to communicate with a user equipment via an access link of the repeater device.

In accordance with a second aspect, a network device including one or more antennas, a transceiver, and a processor is disclosed. In some embodiments, the processor is configured to cause the network device to: determine a first coverage region of a repeater device based on a first beam at the network device paired with the repeater device, wherein the first coverage region corresponds to a direction such that the first beam falls within the first coverage region for serving a control link or a backhaul link between the repeater device and the network device; and provide, to the repeater device, a first indication of a number of one or more coverage regions, wherein the number of the one or more coverage regions is based at least on a capability of the repeater device, and the one or more coverage regions are to be determined with respect to the first coverage region by the repeater device, wherein the one or more coverage regions correspond to respective wider directions for determining beams that may be configured for communicating with a user equipment via an access link of the repeater device.

In accordance with a third aspect, a method for operating a repeater device is disclosed. In some embodiments, the method includes: determining a first coverage region based on a first beam at the repeater device paired with a network device, wherein the first coverage region corresponds to a direction such that the first beam falls within the first coverage region for serving a control link or a backhaul link between the repeater device and the network device; and based on a first indication, determining one or more coverage regions with respect to the first coverage region, wherein the one or more coverage regions are configured to communicate with a user equipment via an access link of the repeater device.

In accordance with a fourth aspect, a method for operating a network device is disclosed. In some embodiments, the method includes: determining a first coverage region of a repeater device based on a first beam at the network device paired with the repeater device, wherein the first coverage region corresponds to a direction such that the first beam falls within the first coverage region for serving a control link or a backhaul link between the repeater device and the network device; and providing, to the repeater device, a first indication of a number of one or more coverage regions, wherein the number of the one or more coverage regions is based at least on a capability of the repeater device, and the one or more coverage regions are to be determined with respect to the first coverage region by the repeater device, wherein the one or more coverage regions correspond to respective wider directions for determining beams that may be configured for communicating with a user equipment via an access link of the repeater device.

In accordance with a fifth aspect, an apparatus for operating a repeater device is disclosed. In some embodiments, the apparatus includes a processor configured to cause the repeater device to perform methods disclosed herein.

In accordance with a sixth aspect, an apparatus for operating a network device is disclosed. In some embodiments, the apparatus includes a processor configured to cause the network device to perform methods disclosed herein.

In accordance with a seventh aspect, a non-transitory computer-readable memory medium storing program instructions is disclosed. In some embodiments, when executed by a computer system, the instructions cause implementation of method disclosed herein.

In accordance with an eighth aspect, a computer program product comprising program instructions is disclosed. In some embodiments, when executed by a computer system, the instructions cause implementation of method disclosed herein.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE SEVERAL VIEWS OF THE DRAWINGS

A better understanding of the present subject matter can be obtained when the following detailed description of various embodiments is considered in conjunction with the following drawings.

Figure 1:
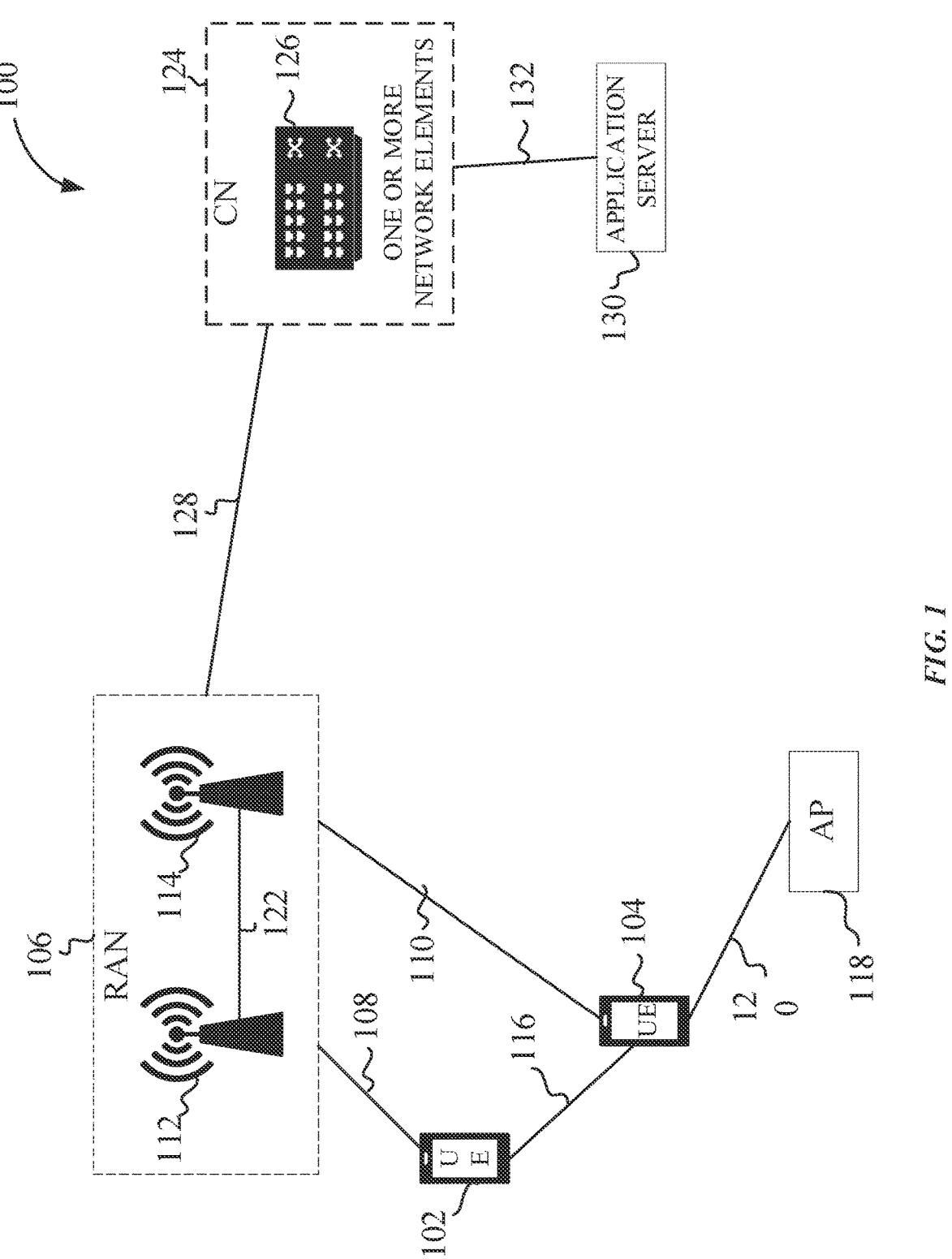
FIG. 1 illustrates an example architecture of a wireless communication system, according to embodiments disclosed herein.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

| |
|---|
| CE: Control Element |
| DCI: Downlink Control Information |
| DL: DownLink |
| FR: Frequency Range |
| Fwd: Forward |
| MAC: Medium Access Control |
| MT: Mobile Termination |
| NCR: Network-Controlled Repeater |
| NR: New Radio |
| NW: Network |
| OAM: Operation Administration and Maintenance |
| PDSCH: Physical Downlink Shared Channel |
| PRACH: Physical Random Access Channel |
| PUSCH: Physical Uplink Shared Channel |
| RAN: Radio Access Network |
| RRC: Radio Resource Control |
| RRM: Radio Resource Management |
| RX: Receive |
| SSB: Synchronization Signal Block |
| TCI: Transmission Configuration Indication |
| TDD: Time-Division Duplex |
| TX: Transmit |
| UE: User Equipment |
| UL: UpLink |

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

As shown by FIG. 1, the wireless communication system 100 includes UE 102 and UE 104 (although any number of UEs may be used). In this example, the UE 102 and the UE 104 are illustrated as smartphones (e.g., handheld touchscreen mobile computing devices connectable to one or more cellular networks), but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112 and base station 114, that enable the connection 108 and connection 110.

In this example, the connection 108 and connection 110 are air interfaces to enable such communicative coupling, and may be consistent with RAT(s) used by the RAN 106, such as, for example, an LTE and/or NR.

In some embodiments, the UE 102 and UE 104 may also directly exchange communication data via a sidelink interface 116. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fi® router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 and/or the base station 114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 112 or base station 114 may be implemented as one or more software entities running on server computers as part of a virtual network. In addition, or in other embodiments, the base station 112 or base station 114 may be configured to communicate with one another via interface 122. In embodiments where the wireless communication system 100 is an LTE system (e.g., when the CN 124 is an EPC), the interface 122 may be an X2 interface. The X2 interface may be defined between two or more base stations (e.g., two or more eNBs and the like) that connect to an EPC, and/or between two eNBs connecting to the EPC. In embodiments where the wireless communication system 100 is an NR system (e.g., when CN 124 is a 5GC), the interface 122 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 124).

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface. In embodiments, the S1 interface may be split into two parts, an S1 user plane (S1-U) interface, which carries traffic data between the base station 112 or base station 114 and a serving gateway (S-GW), and the S1-MME interface, which is a signaling interface between the base station 112 or base station 114 and mobility management entities (MMEs).

In embodiments, the CN 124 may be a 5GC, and the RAN 106 may be connected with the CN 124 via an NG interface 128. In embodiments, the NG interface 128 may be split into two parts, an NG user plane (NG-U) interface, which carries traffic data between the base station 112 or base station 114 and a user plane function (UPF), and the S1 control plane (NG-C) interface, which is a signaling interface between the base station 112 or base station 114 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

Figure 2:
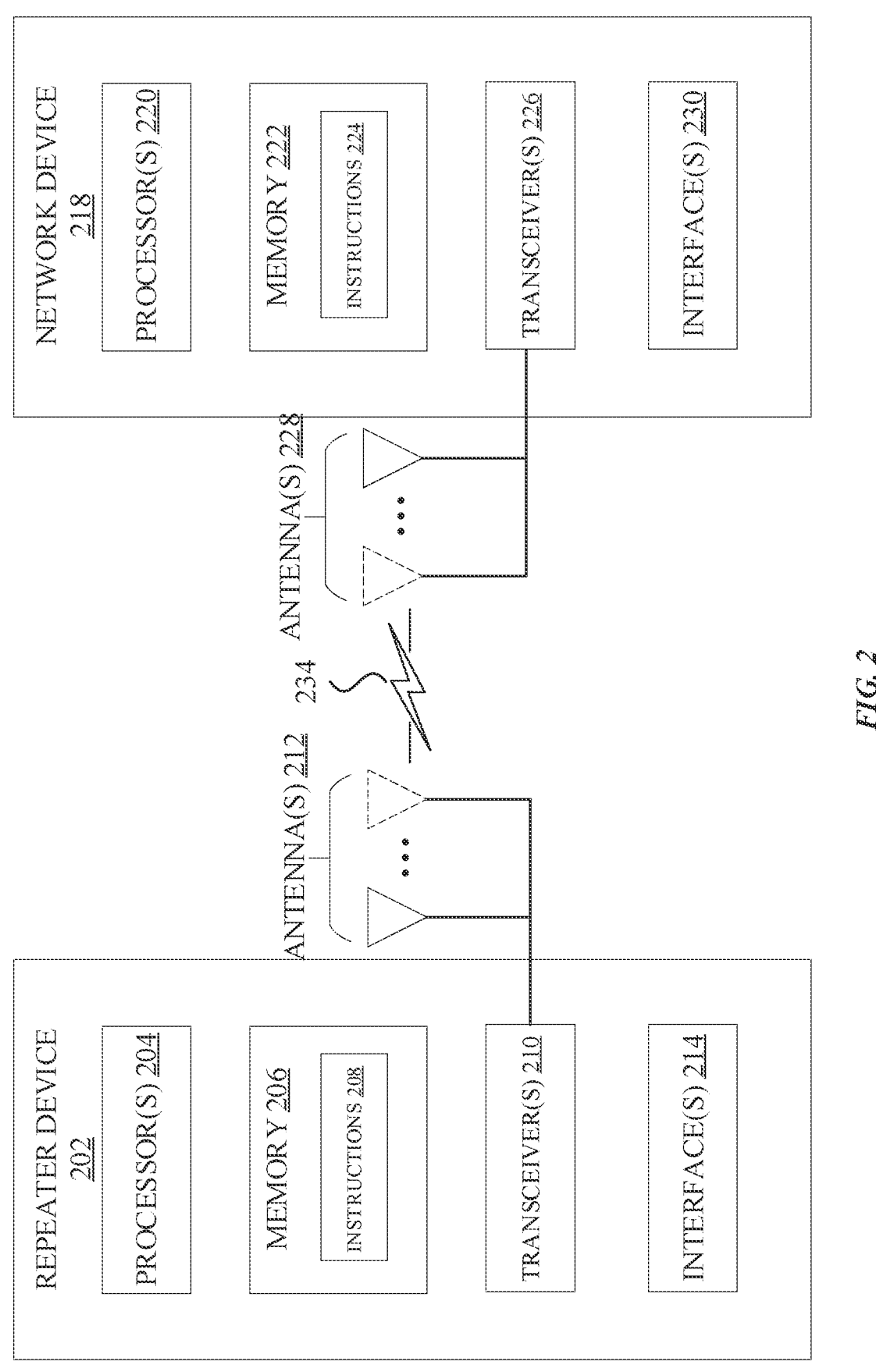
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a repeater device of a wireless communication system. The network device 218 may be, for example, a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 210/antenna(s) 212 already described) that allow for communication between the UE and other devices and may operate according to known protocols.

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230. The interface(s) 230 may be used to provide input to or output from the network device 218. For example, a network device 218 that is a base station may include interface(s) 230 made up of transmitters, receivers, and other circuitry (e.g., other than the transceiver(s) 226/antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

In certain situations, direct wireless communication between multiple devices may be difficult because there is a blockage between a first device and a second device or because the first device is out of coverage of the second device. In such scenarios, a repeater device may be configured to extend the coverage of the second device by amplifying signals transmitted between the first device and the second device. In some examples, the repeater device may be dynamically controlled by a network device so that a configuration of the repeater device can be dynamically adjusted or reconfigured depending on the conditions of the wireless communication system.

Figure 3:
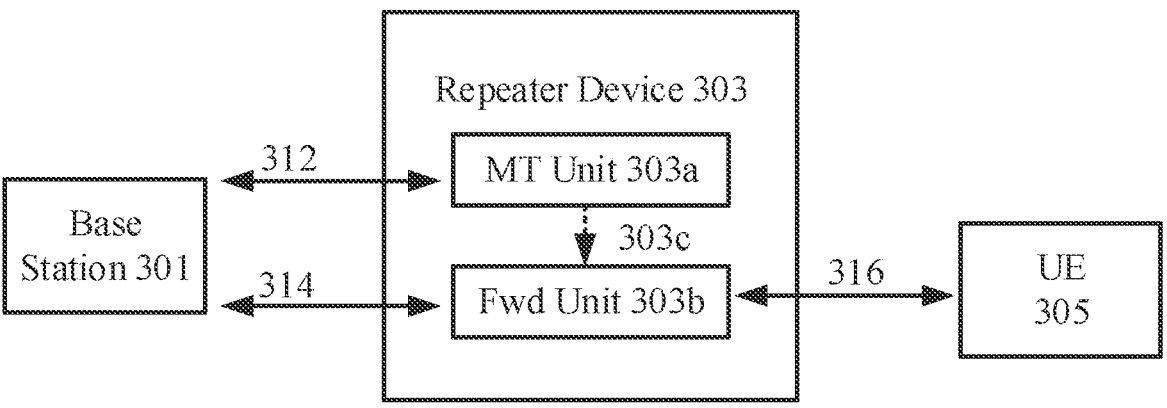
FIG. 3 is a block diagram illustrating example components and communication links associated with a repeater device according to embodiments disclosed herein.

FIG. 3 is a block diagram illustrating example components and communication links associated with a repeater device 303 according to embodiments disclosed herein. The repeater device 303 may be in communication with a base station 301 and a UE 305, with traffic between the base station 301 and the UE 305 received and transmitted through the repeater device 303. The base station 301 may correspond to any of the base stations or the network device of FIG. 1 and FIG. 2. The repeater device 303 may correspond to the wireless device of FIG. 2.

As shown in FIG. 3, the repeater device 303 includes a MT unit 303a and an Fwd unit 303b. The MT unit 303a can communicate with the base station 301, and control or configure the repeater device 303 (e.g., the Fwd unit 303b) based on control signaling (including control information) from the base station 301. The Fwd unit 303b can provide relaying (e.g., reception, amplification, and transmission) functionality to permit communication of traffic (e.g., user data, control information for the UE 305) from the base station 301 to reach the UE 305 and/or to enable traffic from the UE 305 to reach the base station 301. In an example, the Fwd unit 303b is an analog pass-through device (e.g., without store and forward capability). In another example, the Fwd unit 303b includes store and forward functionality.

As shown in FIG. 3, a control link 312 can be established between the base station 301 and the repeater device 303 (in particular, the MT unit 303a). The control link 312 may be bidirectional and implemented based on a Uu interface protocol. Thus, the base station 301 can configure or control the repeater device 303 by exchanging control information for the repeater device 303 with the MT unit 303a via the control link 312. In other words, the control link 312 may carry the control information for the repeater device 303, including various indications for configuring or controlling the repeater device discussed below.

As shown in FIG. 3, a backhaul link 314 can be established between the base station 301 and the repeater device 303 (in particular, the Fwd unit 303b), and an access link 316 can be established between the UE 305 and the repeater device 303 (in particular, the Fwd unit 303b). Thus, the repeater device 303 communicates with the base station 301 via the backhaul link 314, and communicates with the UE 305 via the access link 316. In other words, the backhaul link 314 can carry analog UL traffic and DL traffic between the base station 301 and the repeater device 303, and the access link 316 can carry analog UL traffic and DL traffic between the repeater device 303 and the UE 305.

In some embodiments, the control link 312 and the backhaul link 314 between the base station 301 and the repeater device 303 may both correspond to a first beam pair (not shown). In the DL, the first beam pair includes a TX beam at the base station 301 and an RX beam at the repeater device 303; in the UL, the first beam pair includes a TX beam at the repeater device 303 and an RX beam at the base station 301. In some embodiments, a beam correspondence can be assumed for the first beam pair. In some embodiments, the first beam pair (e.g., the control link and/or the backhaul-link) may operate within the FR1 or FR2 frequency range. In some embodiments, the control link 312 may be implemented using a relatively small BWP that is in-band with the BWPs allocated for UL transmission and/or DL transmission between the base station 301 and the UE 305.

In some embodiments, the access link 316 between the repeater device 303 and the UE 305 may correspond to a second beam pair (not shown). In the DL, the second beam pair includes a TX beam at the repeater device 303 and an RX beam at the UE 305; in the UL, the second beam pair includes a TX beam at the UE 305 and an RX beam at the repeater device 303. In some embodiments, a beam correspondence can be assumed for the second beam pair. In some embodiments, the second beam pair (e.g., the access link) may operate within the FR1 or FR2 frequency range.

By providing the control information for the repeater device via the control link 312, the base station 301 can control the operation of the Fwd unit 303*b* through the MT unit 303*a*. For example, the base station 301 can configure the MT unit 303*a* with the control information to cause the MT unit 303*a* to configure the Fwd unit 303*b* (e.g., through a signal path 303*c*). In addition, the base station 301 can directly control the Fwd unit 303*b* through the backhaul link 314. For example, the base station 301 may schedule UL transmissions and DL transmissions for the Fwd unit 303*b* to handle.

Figure 4:
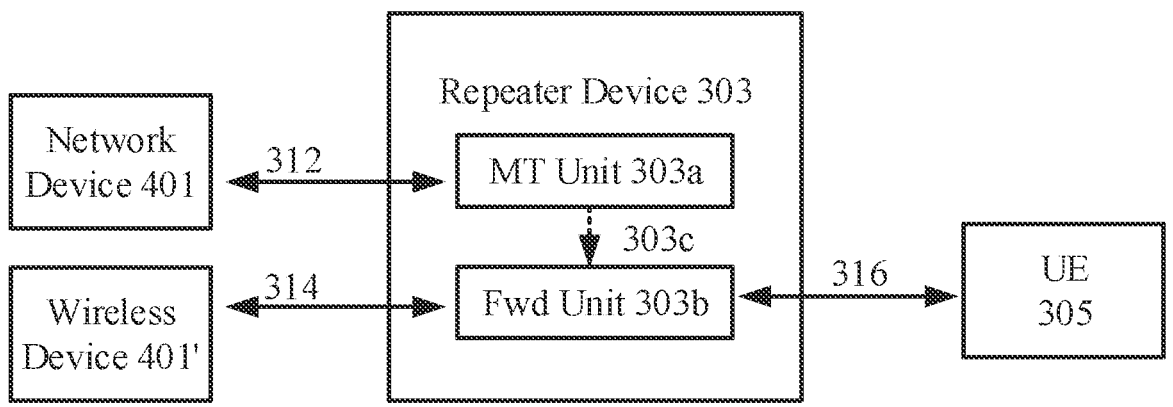
FIG. 4 is another block diagram illustrating example components and communication links associated with a repeater device according to embodiments disclosed herein.

FIG. 4 is another block diagram illustrating example components and communication links associated with a repeater device 303 according to embodiments disclosed herein. The repeater device 303 may be in communication with a network device 401, a wireless device 401', and a UE 305. The network device 401 may correspond to any of the base stations or the network device of FIG. 1 and FIG. 2. The repeater device 303 may correspond to the wireless device of FIG. 2. The wireless device 401' may correspond to any of the base stations, the network device, or the wireless device of FIG. 1 and FIG. 2.

The example in FIG. 4 can be better understood with reference to above descriptions on FIG. 3, with differences therebetween explained in the following. As shown in FIG. 4, the repeater device 303 can establish the control link 312 and the backhaul link 314 separately with different devices, i.e., the network device 401 and the wireless device 401'. In particular, the control link 312 is established between the network device 401 and the repeater device 303 (in particular, the MT unit 303*a*). Thus, the network device 401 can configure or control the repeater device 303 by exchanging control information for the repeater device 303 with the MT unit 303*a* via the control link 312. Compared to FIG. 3 where the control link 312 and the backhaul link 314 correspond to a same beam pair between the base station 301 and the repeater device 303, in the example of FIG. 4, the control link 312 and the backhaul link 314 may correspond to different beam pairs between the network device 401 and the repeater device 303 or between the wireless device 401' and the repeater device 303.

In this way, the network device 401 can control the operation of the Fwd unit 303*b* through the MT unit 303*a*. For example, the network device 401 can configure the MT unit 303*a* with the control information to cause the MT unit 303*a* to configure the Fwd unit 303*b*.

In some embodiments, the repeater device 303 is a NCR in 5G NR, the control information for the repeater device 303 can be referred to as a side control information, which may include beamforming information, timing information to align transmission/reception boundaries of the repeater device 303, information on UL-DL TDD configuration, ON-OFF information for efficient interference management and improved energy efficiency, or power control information for efficient interference management, etc. Some of various indications discussed below for configuring or controlling the repeater device can be carried in the side control information.

In the following, the base station and the network device can be used interchangeably in terms of their control functionality with respect to the repeater device. Although the examples and embodiments are described more with the base station, the network device can equally apply at least in terms of control or configuration with respect to the repeater device.

Figure 5A:
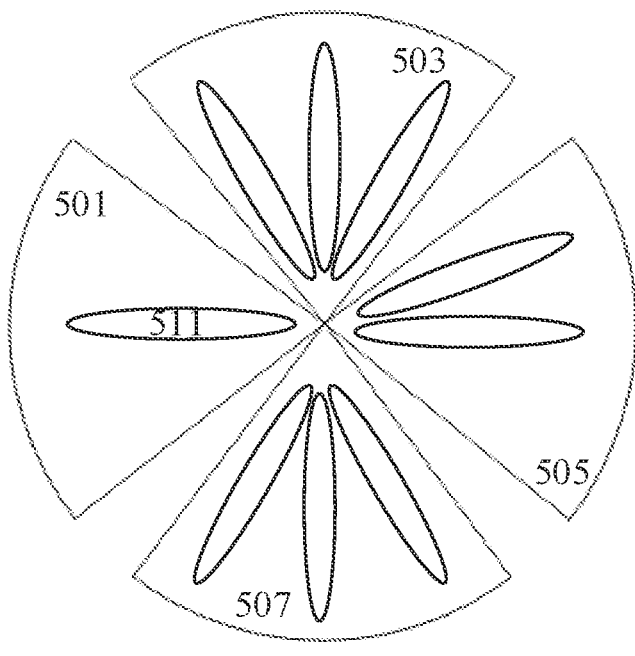
FIGS. 5A-5B are diagrams illustrating example coverage regions associated with a repeater device according to embodiments disclosed herein.

FIG. 5A is a diagram illustrating example coverage regions associated with the repeater device 303 according to embodiments disclosed herein. As shown in FIG. 5A, the repeater device 303 is configured with multiple coverage regions for providing services to UEs or for communicating with the base station or the network device. In particular, there are four coverage regions associated with the repeater device 303, namely, a first coverage region 501, a second coverage region 503, a third coverage region 505, and a fourth coverage region 507. In some embodiments, the first coverage region 501 is configured for communicating with the base station or the network device via the backhaul link and/or the control link, and the other coverage regions are configured for communicating with multiple UEs via the access link. In the present disclosure, the first coverage region 501 can be named a control link coverage region or a backhaul link coverage region, the coverage region 503-507 can be named access link coverage regions.

Figure 5B:
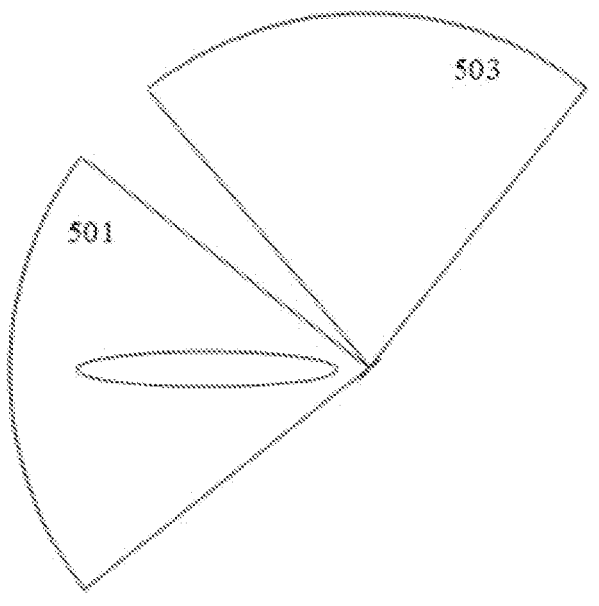

In the example of FIG. 5A, by configuring multiple (i.e., 3) and separate access link coverage regions to provide services, the chance can be increased for the repeater device 303 to cover more UEs which may be distributed in various directions around the repeater device 303, or the repeater device 303 can provide flexible coverage for one or more UEs in a specific direction by separately activating one or more corresponding coverage regions. The benefits can be apparent when compared with an example in FIG. 5B, where two coverage regions are associated with the repeater device, and only one fixed coverage region 503 is the access link coverage region configured to provide services to UEs only located in that direction.

In some implementations, the coverage regions are provided by the repeater device 303 like sectors. Thus, the coverage region can be called a coverage sector and the two terms can be used interchangeably in the present disclosure. In some implementations, the coverage regions can be provided by using separate directional antennas, or by using antenna arrays. In an embodiment, all the coverage regions can be substantially equally spaced. In another embodiment, the access link coverage regions are substantially equally spaced. The term "equally spaced" may indicate any neighbors of the multiple coverage regions are formed with substantial equal space with each other.

In some embodiments, the coverage region 501 can be used as a reference for forming the access link coverage regions 503-507. In some examples, the reference coverage region corresponds to a direction such that a beam for serving a control link or a backhaul link between the repeater device and the network device falls within the reference coverage region. In FIG. 5A, the beam 511 is a beam used to form a beam pair for serving a control link or a backhaul link between the repeater device 303 and the base station 301 (or the network device 401). The reference coverage region 501 is a coverage region where the beam 511 falls in.

In some embodiments, the access link coverage regions correspond to respective wider directions for determining beams that may be configured for communicating with UEs via an access link of the repeater device. For example, the repeater device 303 can be configured to perform beamforming within one or more indicated access link coverage regions. By configuring the repeater device 303 to direct one or more beams within a particular coverage region, beam directivity at the repeater device 303 can be improved in the sense that access link beams will not be directed to areas where services may not be required. In some embodiments, such beamforming can be named coverage region-based beamforming. It will be appreciated that, with such beamforming, even when the base station may not control a direction of each access link beam, the base station can control such beam direction at the level of the access link coverage region.

Capability for Coverage Configuration of a Repeater Device

In some embodiments, to reflect the repeater device's support for separate and flexible coverage configuration, a capability can be introduced for the repeater device. For example, the repeater device can report its capability to the network device, such that the network device can configure the coverage regions of the repeater device based on or within the capability.

In an implementation, the capability comprises information explicitly indicating whether the repeater device supports separate configuration of coverage regions for one or more frequency ranges. For example, a one-bit flag can be used for such indication for a particular one or multiple frequency ranges.

In an implementation, the capability comprises information indicating a total number of coverage regions the repeater device supports for one or more frequency ranges. The total numbers for the one or more frequency ranges may be the same or different. In an example, the total number is used as an implicit indication that the repeater device supports separate configuration of coverage regions for respective frequency ranges.

In an implementation, the capability comprises information explicitly indicating whether the repeater device supports separate configuration for horizontal coverage regions, and/or information explicitly indicating whether the repeater device supports separate configuration for vertical coverage regions. Again, a one-bit flag can be used for such indication for a particular one or multiple frequency ranges.

In an implementation, the capability comprises information indicating a number of horizontal and/or vertical coverage regions the repeater device supports for one or more frequency ranges. The numbers for the one or more frequency ranges may be the same or different. In an example, the number is used as an implicit indication that the repeater device supports separate configuration of horizontal and/or vertical coverage regions for respective frequency ranges.

In an implementation, the capability comprises information explicitly indicating whether the repeater device supports a coverage region-based beamforming for one or more frequency ranges. For example, a one-bit flag can be used for such indication for a particular one or multiple frequency ranges.

In an implementation, the capability comprises information indicating a number of beams the repeater device supports within at least one coverage region for one or more frequency ranges. The numbers for the one or more frequency ranges may be the same or different. In an example, the number is used as an implicit indication that the repeater device supports coverage region-based beamforming for respective frequency ranges.

Forming Coverage Regions

Figure 6A:
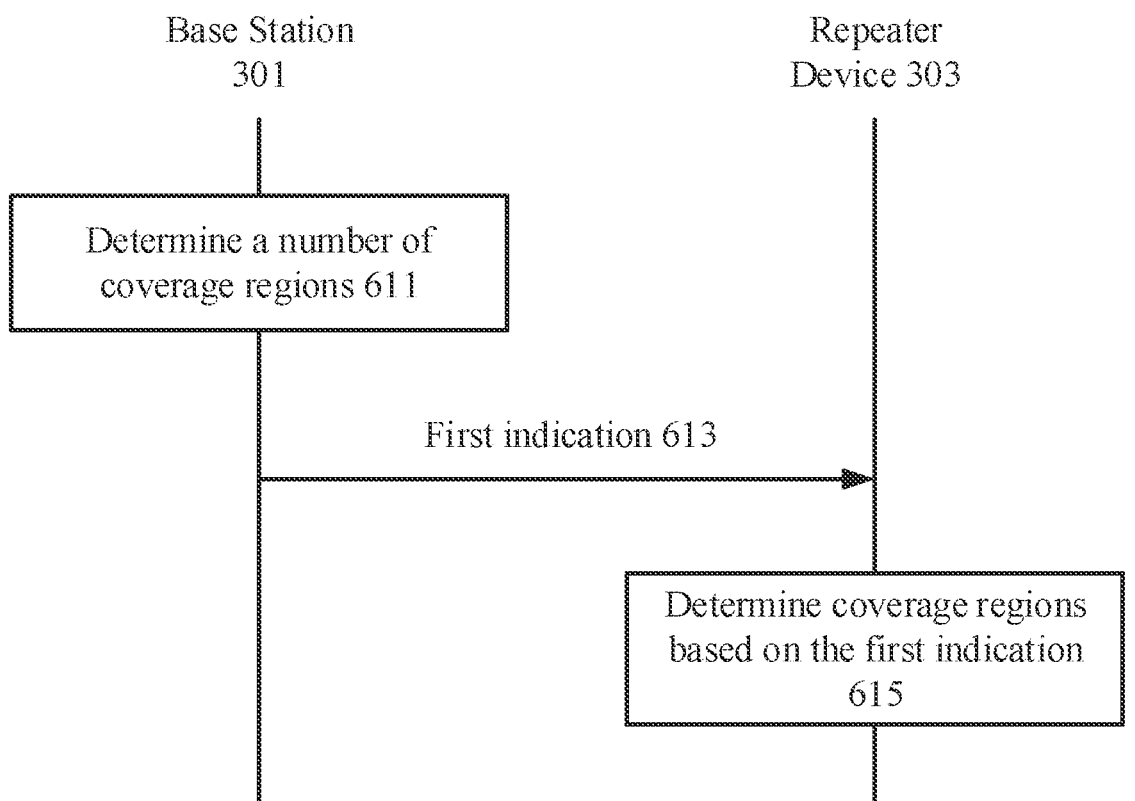
FIGS. 6A-6C illustrate example operations of the base station and the repeater device and signaling interactions therebetween according to embodiments disclosed herein.

FIG. 6A illustrates example operations of the base station 301 and the repeater device 303 and signaling interactions therebetween according to embodiments disclosed herein. In the example of FIG. 6A, the base station 301 can configure or control the repeater device 303 to form separate coverage regions based on the capability of the repeater device 303.

As shown in FIG. 6A, at 611, the base station 301 determines a number of one or more coverage regions to be formed by the repeater device 303. In an example, the one or more coverage regions include just the access link coverage regions. In another example, the one or more coverage regions include the control link coverage regions and/or the backhaul link coverage regions, in addition to the access link coverage regions. The number of the coverage regions can be based on the capability of the repeater device 303, or further based on locations where coverage is needed. For example, the base station 301 can detect UEs located at those locations for a relatively long period. Thus, depending on the capability of the repeater device 303, the base station 301 can configure or control the repeater device 303 to form separate coverage regions. In some embodiments, the separate coverage regions can include horizontal and/or vertical coverage regions.

As shown in FIG. 6A, at 613, the base station 301 provide a first indication of the determined number of coverage regions to the repeater device 303. The below Tables 1a-1c illustrate examples of the first indication.

TABLE 1a

| | Number of Coverage Regions |
| --- | --- |
| Frequency Range A | 3 |
| Frequency Range B | 5 |

TABLE 1b

| | Number of Coverage Regions | Horizontal or Vertical |
| --- | --- | --- |
| Frequency Range A | 3 | H |
| Frequency Range B | 5 | V |

TABLE 1c

| | Number of Horizontal Coverage Regions | Number of Vertical Coverage Regions |
| --- | --- | --- |
| Frequency Range A | 3 | 2 |
| Frequency Range B | 5 | 1 |

As shown in FIG. 6A, at 615, upon receiving the first indication from the base station 301, the repeater device 303 determines one or more access link coverage regions based on the number of coverage regions reflected in the first indication. Thus, the repeater device 303 can provide services to UEs in the one or more coverage regions via the access link. In some embodiments, the one or more coverage regions are configured such that any neighbors of the one or more coverage regions are spaced substantially equally. In this way, the repeater device 303 can extend the coverage of the base station 301 and distribute the coverage around the repeater device 303. When both the horizontal coverage regions and the vertical coverage regions are configured, the repeater device 303 can form the coverage regions in the 3D space.

As discussed with reference to FIG. 5, there is a control link or backhaul link coverage region 501 at the repeater device. In some embodiments, such coverage region can be used as a reference (e.g., in terms of direction) for the repeater device 303 to form the access link coverage regions. The coverage region 501 can be determined and formed based on a beam pair between the repeater device and the base station or the network device. Thus, the beam pair can fall within the coverage region. It will be appreciated that the beam pair comprises a TX beam at the base station or the network device and an RX beam at the repeater device in the DL; and the beam pair comprises a TX beam at the repeater device and an RX beam at the base station or the network device in the UL. For example, beam correspondence can be assumed for the beam pair. In some embodiments, the beam pair is determined based on a beam management procedure between the repeater device and the base station or the network device, or determined based on an initial setup of the repeater device.

In some implementations, the first indication can be semi-statically or dynamically configured by the base station or the network device via at least one of an RRC signaling, a MIB, a SIB, a MAC CE, or a DCI. After an initial configuration, the base station or the network device can re-configure forming of the coverage regions at the repeater device based on another round of operations 611-615.

In some implementations, instead of reflecting the number of coverage regions in the first indication, the number of coverage regions can be hard-coded on the repeater device, for example, via an OAM entity. The base station can obtain the number of coverage regions from either the repeater device or the OAM entity.

Indexing Coverage Regions

Figure 7:
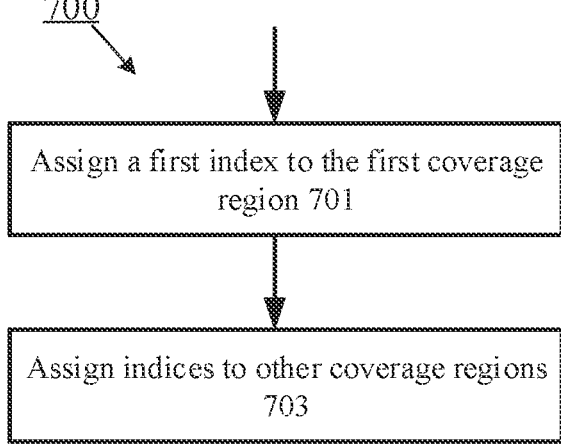
FIG. 7 illustrates an example method for assigning indices to the access link coverage regions according to embodiments disclosed herein.

FIG. 7 illustrates an example method 700 for assigning indices to the access link coverage regions according to embodiments disclosed herein. It will be appreciated that the operations can be performed by both the base station 301 and the repeater device 303.

As shown in FIG. 7, at 701, a first index is assigned to a reference coverage region (e.g., the control link or backhaul link coverage region). For example, an index "0" can be assigned to the first coverage region 501. At 703, an index is assigned, in a sequential order with respect to the first index, to each of the one or more access link coverage regions. For example, the indices "1", "2", "3" are assigned to the second to fourth coverage regions 503-507.

Since the operations can be performed at both the base station 301 and the repeater device 303, the two sides have consistent mapping of the indices to the respective coverage regions. Thus, the coverage regions can be indicated by using the indices between the base station 301 and the repeater device 303. This will be helpful for the base station 301 to configure the repeater device 303 at least in terms of coverage regions, as discussed in the following.

In some embodiments, when the coverage regions are updated, for example, the number of coverage regions and/or the direction of the coverage regions are changed, the coverage regions will be re-indexed by the method 700. In some situation, the reference coverage region may be changed from the coverage region of index "0" to the coverage region of index "1", and the previous reference coverage region becomes an access link coverage region. In this case, considering the formed coverage regions are the same (not changed), no re-indexing is required. Again, the base station 301 and the repeater device 303 will have consistent understanding of the changed role of the above two coverage regions.

Activation of Coverage Regions

Figure 6B:
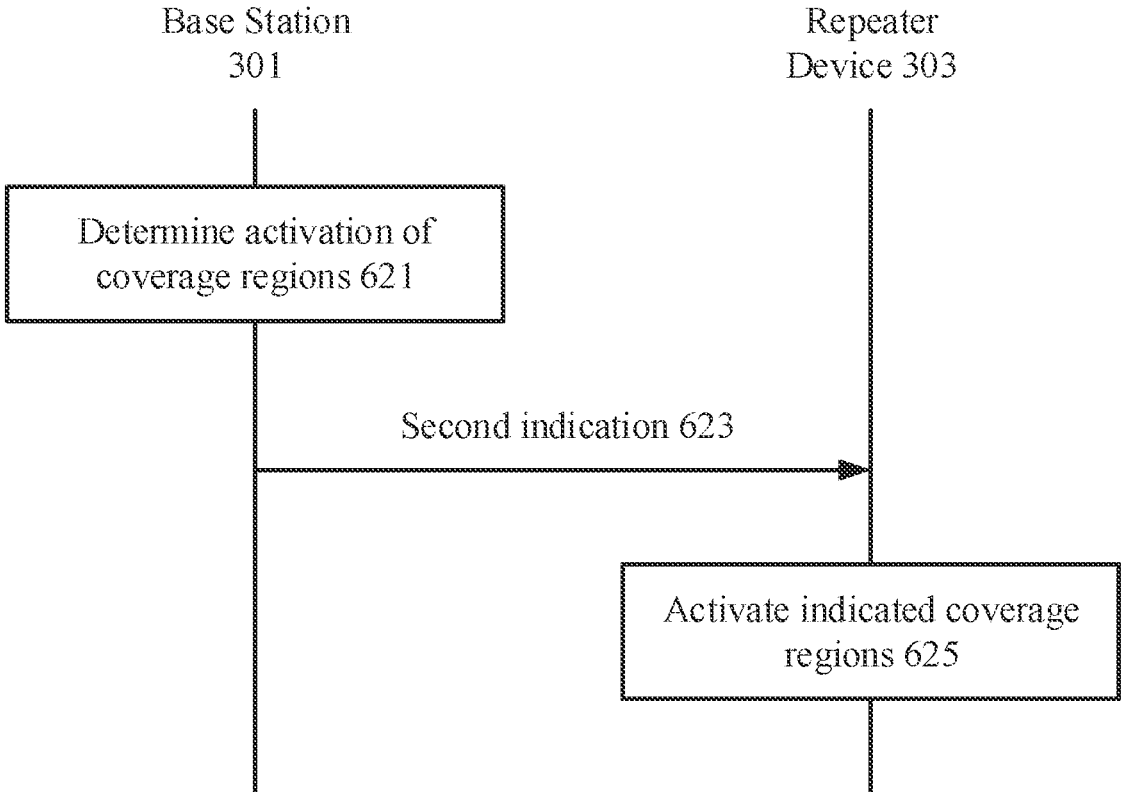

FIG. 6B illustrates example operations of the base station 301 and the repeater device 303 and signaling interactions therebetween according to embodiments disclosed herein. In the example of FIG. 6B, the base station 301 can configure or control the repeater device 303 to activate separate coverage regions. It will be appreciated that a formed coverage region will provide coverage or service after being activated.

As shown in FIG. 6B, at 621, the base station 301 determines how to activate the configured access link coverage regions of the repeater device 303, in order to provide services to UEs within corresponding coverage regions. In some implementations, the base station 301 determines which of the configured access link coverage regions to activate. For example, this determination may be based on service needs within each coverage region at that time, which can be detected by the base station 301. In an example, the base station 301 determines to activate some or all of the coverage regions 503-507. In another example, the base station 301 further determines durations for activating the respective coverage regions, which may be the same or different. In a further example, the base station 301 determines to activate the respective coverage regions in a periodic sweeping manner.

As shown in FIG. 6B, at 623, the base station 301 provide, a second indication reflecting at least indices of coverage regions to be activated, to the repeater device 303. In some embodiments, the second indication further includes the activation duration for each coverage region, and/or a period for sweeping the activated coverage regions. The below Tables 2a-2d illustrate examples of the second indication.

TABLE 2a

| Indices of Coverage Regions to be Activated |
| --- |
| 1, 3 |

TABLE 2b

| Index of Coverage Region | To be activated? |
| --- | --- |
| 1 | 1 |
| 2 | 0 |
| 3 | 1 |

TABLE 2c

| Index of Coverage Region | To be activated? | Duration |
|---|---|---|
| 1 | 1 | X ms |
| 2 | 0 | — |
| 3 | 1 | Y ms |

TABLE 2d

| Index of Coverage Region | To be activated? | Duration | Period |
|---|---|---|---|
| 1 | 1 | X ms | X + Y ms |
| 2 | 0 | — | |
| 3 | 1 | Y ms | |

TABLE 3a

| Index of Access Link Coverage Region | Number of Access Link Beams | Beam Index |
|---|---|---|
| 1 | 3 | 1, 2, 3 |
| 2 | 2 | 7, 8 |
| 3 | 3 | 4, 5, 6 |

TABLE 3b

| Index of Access Link Coverage Region | Number of Access Link Beams | Beam Index |
|---|---|---|
| 1 | 3 | 1, 2, 3, 4, 5, 6, 7, 8 |
| 2 | 2 | |
| 3 | 3 | |

As shown in FIG. 6B, at 625, upon receiving the second indication from the base station 301, the repeater device 303 activates one or more coverage regions (for example, some or all of the coverage regions 503-507) based on indices of coverage regions included in the second indication. By separate configuration/activation of the coverage regions, the repeater device 303 can provide coverage as needed, and avoid a waste of resources in connection with providing coverage where there is no service requirement. In an example, the repeater device 303 separately activates some or all of the coverage regions 503-507 as indicated by indices. In another example, the repeater device 303 activates each coverage region for a duration as included in the second indication. In a further example, the repeater device 303 activates the respective coverage regions in a periodic sweeping manner according to a period included in the second indication.

In some implementations, the second indication can be semi-statically or dynamically configured by the base station or the network device via at least one of an RRC signaling, a MIB, a SIB, a MAC CE, or a DCI. After an initial configuration, the base station or the network device can re-configure activation of the coverage regions by another round of operations 621-625.

Beamforming within Coverage Regions

Figure 6C:
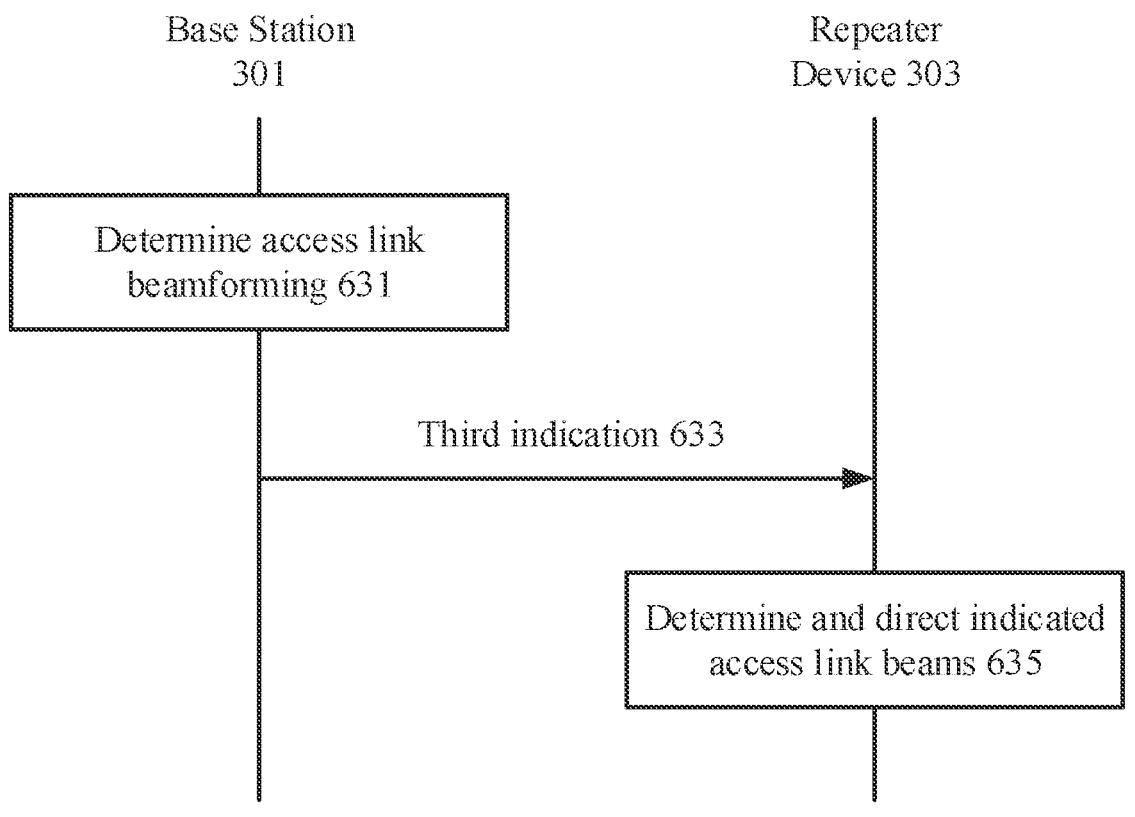

FIG. 6C illustrates example operations of the base station 301 and the repeater device 303 and signaling interactions therebetween according to embodiments disclosed herein. In the example of FIG. 6C, the base station 301 can configure or control the repeater device 303 to perform coverage region-based beamforming based on the capability of the repeater device 303. In some embodiments, a coverage region can be implemented as a wider beam than beams directed in the coverage region. Thus, an index of the coverage region can also be referred to as a beam index (i.e., an index of the wider beam), TCI states can be configured and indicated within such beam index.

As shown in FIG. 6C, at 631, the base station 301 determines a number of beams (or "access link beams" hereinafter) to be formed by the repeater device 303 within one or more activated access link coverage regions. The base station 301 may also determine a beam configuration for each of the access link beams.

As shown in FIG. 6C, at 633, the base station 301 provide, a third indication reflecting the number of access link beams for respective activated coverage regions. In some embodiments, the third indication further includes the beam configuration for each of the access link beams. The below Table 3a-3b illustrate examples of the third indication.

As shown in FIG. 6C, at 635, upon receiving the third indication from the base station 301, the repeater device 303 determines one or more access link beams within the respective coverage region based on the number included in the third indication. Concurrently or subsequently, the repeater device 303 can direct the determined one or more access link beams within the respective coverage region. In some embodiments, the repeater device 303 obtains the beam configuration for each of the access link beams from the third indication, and configures the access link beams accordingly.

In some implementations, the third indication can be semi-statically or dynamically configured by the base station or the network device via at least one of an RRC signaling, a MIB, a SIB, a MAC CE, or a DCI. After an initial configuration, the base station or the network device can re-configure the coverage region-based beamforming by another round of operations 631-635.

Configuration of Access Link Beams

Referring to Table 3a, for the access coverage region of the index "1" (e.g., the second coverage region 503 in FIG. 5A), the base station 301 configures three access link beams. Since the base station 301 and the repeater device 303 have consistent assignment of the indices to the access link coverage regions, the repeater device 303 can determine that three access link beams are configured for the second coverage region 503 based on the index "1". In Table 3a, the beam indices "1", "2", and "3" are configured for the three beams. Accordingly, the repeater device 303 can direct the three beams based on the beam indices. In some embodiments, the directivity of the three beams can be transparent to the base station 301, which means the repeater device 303 (instead of the base station 301) can control directions of the three beams of indices "1", "2", and "3" within the second coverage region 503.

In the example of Table 3b, the base station can configure the set of beam indices 1-8 across the access link coverage regions, instead of assigning the three separate sets of beam indices to respective access link coverage regions. Thus, the repeater device 303 can have more freedom to direct the beams within each access link coverage region based on the indicated number of access link beams.

In Tables 3a-3b, the beam index is indicative of a beam configuration for the access link beam. In some implementations, a TCI state index can be used to correspond to the beam index. In some embodiments, when indicating a particular beam index or TCI state index with a DCI, the DCI can indicate an index of the source coverage region and an index of the source reference signal jointly (e.g., via a single DCI code point) or separately (e.g., via separate DCI code points).

In some embodiments, in addition to an index of a source reference signal, an index of an access link coverage region is introduced into a TCI state as a source coverage region. QCL of type-D can be defined in the TCI state. In this way, if the TCI state index is indicated to an access link beam within a particular coverage region, a specific signal or channel on the access link beam will be received with the same spatial RX parameter as receiving the source reference signal in the source coverage region. The below Tables 4a-4b illustrate examples of the TCI states. As can be seen, both the SSB and the CSI-RS can serve as the source reference signal. In some embodiments, the TCI states can be configured by the base station 301 or the repeater device 303.

TABLE 4a

| TCI State Index | Source Coverage Region/(Wide) Beam Index | Source RS Index | QCL |
|---|---|---|---|
| 0 | 1 | SSB Index 1 | Type-D |
| 1 | 2 | SSB Index 2 | Type-D |
| 2 | 1 | SSB Index 3 | Type-D |

TABLE 4b

| TCI State Index | Source Coverage Region/(Wide) Beam Index | Source RS Index | QCL |
|---|---|---|---|
| 0 | 1 | CSI-RS Index 1 | Type-D |
| 1 | 2 | CSI-RS Index 2 | Type-D |
| 2 | 3 | CSI-RS Index 3 | Type-D |

Unified TCI Framework Applied to the Repeater Device

In some implementations, a TCI state index can indicate multiple TCI states via separate TCI indications. For example, the multiple TCI states include at least one TCI state for a PDCCH from the network device to the repeater device; at least one TCI state for a PDSCH from the network device to the repeater device; at least one TCI state for a PUCCH from the repeater device to the network device; at least one TCI state for a PUSCH from the repeater device to the network device; at least one TCI state for a downlink forwarding from the repeater device to a user equipment; and/or at least one TCI state for an uplink reception at the repeater device from the user equipment. In some examples, a network device can perform a method to provide a first plurality of TCI states to a repeater device via a first TCI state index, wherein the first plurality of TCI states include those TCI states as listed herein. Accordingly, after receiving the first TCI state index, the repeater device can perform a method to obtain the first plurality of TCI states from the first TCI state index.

In some implementations, a TCI state index can indicate multiple TCI states via a joint TCI indication. For example, the multiple TCI states includes at least one joint TCI state for a PDCCH from the network device to the repeater device, a PDSCH from the network device to the repeater device, a PUCCH from the repeater device to the network device, and a PUSCH from the repeater device to the network device. The multiple TCI states further includes at least one joint TCI state for a downlink forwarding from the repeater device to a user equipment, and an uplink reception at the repeater device from the user equipment. In some examples, a network device can perform a method to provide a second plurality of TCI states to a repeater device, wherein the second plurality of TCI states include those joint TCI states as listed herein. In some examples, the joint TCI states can be indicated by a single TCI index or a single TCI field in a DCI. Alternatively, the above two joint TCI states can be indicated by two different TCI indices or two different TCI fields in the DCI. Accordingly, after receiving the DCI, the repeater device can perform a method to obtain the second plurality of TCI states from the corresponding TCI index (TCI indices) or TCI field(s).

Example Method for the Repeater Device

Figure 8:
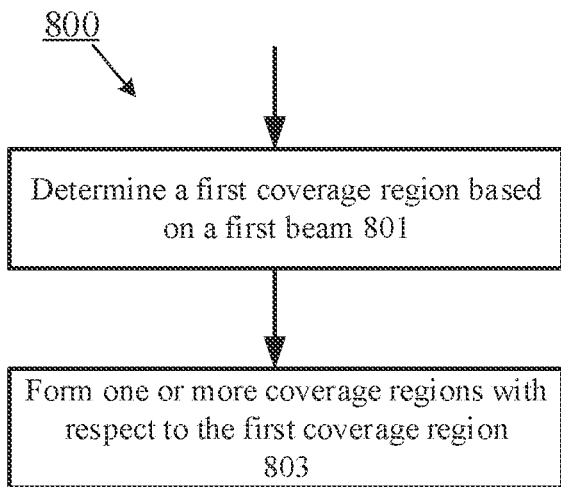
FIG. 8 illustrates an example method for communication according to embodiments disclosed herein.

FIG. 8 illustrates an example method 800 for communication according to embodiments disclosed herein. The method 800 can be performed by the repeater device 303. As shown in FIG. 8, at 801, the repeater device 303 determines a first coverage region based on a first beam at the repeater device paired with a network device. In some embodiments, the first beam corresponds to a transmission beam for transmission to a network device via a control link or a backhaul link between the repeater device and the network device, or a reception beam for reception from the network device via the control link or the backhaul link between the repeater device and the network device, or both the transmission beam and the reception beam. In some embodiments, the first coverage region is determined such that the first beam in a direction towards the network device falls within the first coverage region. At 803, based on a first indication, the repeater device 303 determines one or more coverage regions with respect to the first coverage region. In some embodiments, the one or more coverage regions are configured to indicate beam direction for communication with a user equipment via an access link of the repeater device.

In some implementations, the method 800 further includes: assigning a first index to the first coverage region; and assigning an index, in a sequential order with respect to the first index, to each of the one or more coverage regions.

In some implementations, the first coverage region is implemented as a beam wider than the first beam, and/or the second coverage region is implemented as a beam wider than any of the one or more beam.

In some implementations, the first beam is determined based on a beam management procedure between the repeater device and the network device, or based on an initial setup of the repeater device.

In some implementations, the first indication comprises a number of the one or more coverage regions based on a capability of the repeater device, and the one or more coverage regions are formed such that any neighbors of the one or more coverage regions are spaced substantially equally.

In some implementations, the method 800 further includes: activating a second coverage region of the one or more coverage regions based on a second indication containing an index of the second coverage region, and/or activating the one or more coverage regions separately or in a periodic sweeping manner, and activation durations for the one or more coverage regions are the same or different.

In some implementations, the method 800 further includes: directing one or more beams within the second coverage region based on a third indication, and the third indication comprises configurations of beams associated with at least one of the one or more coverage regions.

In some implementations, at least one of the first indication, the second indication, or the third indication is hard-coded on the repeater device via an OAM entity, or is semi-statically or dynamically configured by the network device via at least one of: an RRC signaling; a MIB; a SIB; a MAC CE; or a DCI.

In some implementations, the method 800 further includes: for a second beam of the one or more beams within the second coverage region, indicating an index of a source coverage region, in addition to an index of a source reference signal, in a corresponding TCI state, wherein the source reference signal comprises at least one of an SSB or a CSI-RS; and indicating a type of QCL in the TCI state, wherein the type of QCL is QCL Type-D.

In some implementations, the method 800 further includes: identifying the second beam based on a DCI from the network device, wherein the DCI indicates an index of the second coverage region and an index of the second beam via a single DCI code point or via separate DCI code points.

In some implementations, the method 800 further includes: providing the capability of the repeater device to the network device, and wherein the capability comprises information indicating at least one of: a total number of coverage regions per frequency range; whether the repeater device supports separate configuration for horizontal coverage regions and/or separate configuration for vertical coverage regions; a number of horizontal and/or vertical coverage regions per frequency range; whether the repeater device supports a coverage region based beamforming; or a number of beams within at least one coverage region per frequency range.

In some implementations, the repeater device is a NCR in 5G NR, and at least one of the first indication, the second indication, and the third indication is comprised in a side control information transmitted over the control link.

In some implementations, the method 800 further includes: obtaining multiple TCI states from a TCI state index, wherein the multiple TCI states comprise: at least one TCI state for a PDCCH from the network device to the repeater device; at least one TCI state for a PDSCH from the network device to the repeater device; at least one TCI state for a PUCCH from the repeater device to the network device; at least one TCI state for a PUSCH from the repeater device to the network device; at least one TCI state for a PDCCH from the network device to the repeater device; and/or at least one TCI state for a PDSCH from the network device to the repeater device.

In some implementations, the method 800 further includes: obtaining multiple TCI states from a TCI state index, wherein the multiple TCI states comprise: at least one joint TCI state for a PDCCH from the network device to the repeater device, a PDSCH from the network device to the repeater device, a PUCCH from the repeater device to the network device, and a PUSCH from the repeater device to the network device; and/or at least one joint TCI state for a PDCCH from the network device to the repeater device, and a PDSCH from the network device to the repeater device.

Embodiments contemplated herein include an apparatus comprising means to perform one or more elements of the method 800. This apparatus may be, for example, an apparatus of a repeater device (such as a repeater device 303, as described herein).

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, a memory of a repeater device (such as a memory 206 of a wireless device 202 that is a repeater device, as described herein).

Embodiments contemplated herein include an apparatus comprising logic, modules, or circuitry to perform one or more elements of the method 800. This apparatus may be, for example, an apparatus of a wireless device (such as a wireless device 202 that is a repeater device, as described herein).

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a repeater device (such as a wireless device 202 that is a repeater device, as described herein).

Embodiments contemplated herein include a signal as described in or related to one or more elements of the method 800.

Embodiments contemplated herein include a computer program or computer program product comprising instructions, wherein execution of the program by a processor is to cause the processor to carry out one or more elements of the method 800. The processor may be a processor of a repeater device (such as a processor(s) 204 of a wireless device 202 that is a repeater device, as described herein). These instructions may be, for example, located in the processor and/or on a memory of the repeater device (such as a memory 206 of a wireless device 202 that is a repeater device, as described herein).

Example Method for the Network Device

Figure 9:
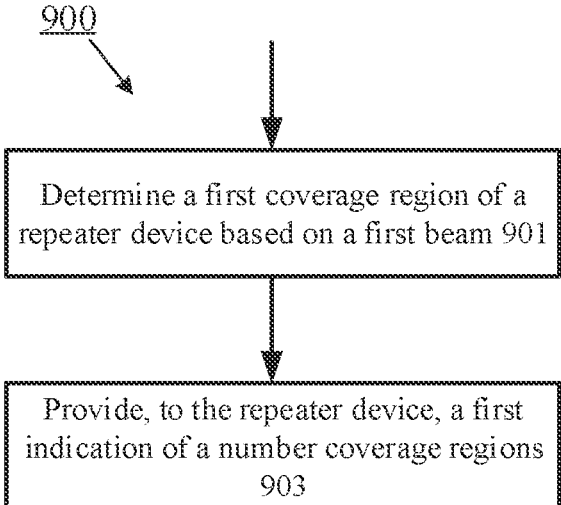
FIG. 9 illustrates another example method for communication according to embodiments disclosed herein.

FIG. 9 illustrates another example method 900 for communication according to embodiments disclosed herein. The method 900 can be performed by a network device, such as the base station 301. As shown in FIG. 9, at 901, the network device, such as the base station 301, determines a first coverage region of a repeater device based on a first beam at the network device paired with the repeater device. In some embodiments, the first beam corresponds to a transmission beam for transmission to the repeater device via a control link or a backhaul link between the repeater device and the network device, or a reception beam for reception from the repeater device via the control link or the backhaul link between the repeater device and the network device, or both the transmission beam and the reception beam. In some embodiments, the first coverage region is determined such that the first beam in a direction towards the repeater device falls within the first coverage region. At 903, the network device, such as the base station 301, provides, to the repeater device, a first indication of a number of one or more coverage regions. In some embodiments, the number of the one or more coverage regions is based at least on a capability of the repeater device, and the one or more coverage regions are to be determined with respect to the first coverage region by the repeater device, and the one or more coverage regions correspond to respective wider directions for determining beams that may be configured for communicating with a user equipment via an access link of the repeater device.

In some implementations, the method 900 further includes: assigning a first index to the first coverage region; and assigning an index, in a sequential order with respect to the first index, to each of the one or more coverage regions.

In some implementations, the first coverage region is implemented as a beam wider than the first beam, and/or the second coverage region is implemented as a beam wider than any of the one or more beams.

In some implementations, the first beam is determined based on a beam management procedure between the repeater device and the network device, or based on an initial setup of the repeater device.

In some implementations, the method 900 further includes: providing a second indication, containing an index of a second coverage region of the one or more coverage regions, to the repeater device for activating the second coverage region, and/or activating the one or more coverage regions separately or in a periodic sweeping manner, and activation durations for the one or more coverage regions are the same or different.

In some implementations, the method 900 further includes: providing a third indication to the repeater device for directing one or more beams within the second coverage region, and the third indication comprises configurations of beams associated with at least one of the one or more coverage regions.

In some implementations, the method 900 further includes: semi-statically or dynamically configuring at least one of the first indication, the second indication, or the third indication via at least one of: an RRC signaling; a MIB; a SIB; a MAC CE; or a DCI.

In some implementations, the method 900 further includes: for a second beam of the one or more beams within the second coverage region, indicating an index of a source coverage region, in addition to an index of a source reference signal, in a corresponding TCI state, wherein the source reference signal comprises at least one of an SSB or a CSI-RS; and indicating a type of QCL in the TCI state, wherein the type of QCL is QCL Type-D.

In some implementations, the method 900 further includes: indicating the second beam of the one or more beams to the repeater device with a DCI, wherein the DCI indicates an index of the second coverage region and an index of the second beam via a single DCI code point or via separate DCI code points.

In some implementations, the method 900 further includes: obtaining the capability of the repeater device from the repeater device.

In some implementations, the network device is a gNB in 5G NR, and at least one of the first indication, the second indication, and the third indication is comprised in a side control information transmitted over the control link.

In some implementations, the method 900 further includes: providing multiple TCI states via a TCI state index, wherein the multiple TCI states are provided in separate TCI indications and comprise: at least one TCI state for a PDCCH from the network device to the repeater device; at least one TCI state for a PDSCH from the network device to the repeater device; at least one TCI state for a PUCCH from the repeater device to the network device; at least one TCI state for a PUSCH from the repeater device to the network device; at least one TCI state for a PDCCH from the network device to the repeater device; and/or at least one TCI state for a PDSCH from the network device to the repeater device.

In some implementations, the method 900 further includes: providing multiple TCI states via a TCI state index, wherein the multiple TCI states are provided in a joint TCI indication and comprise: at least one joint TCI state for a PDCCH from the network device to the repeater device, a PDSCH from the network device to the repeater device, a PUCCH from the repeater device to the network device, and a PUSCH from the repeater device to the network device; and/or at least one joint TCI state for a PDCCH from the network device to the repeater device, and a PDSCH from the network device to the repeater device.

Embodiments contemplated herein include an apparatus comprising means to perform one or more elements of the method 900. This apparatus may be, for example, an apparatus of a base station (such as a network device 218 that is a base station, as described herein).

Embodiments contemplated herein include one or more non-transitory computer-readable media comprising instructions to cause an electronic device, upon execution of the instructions by one or more processors of the electronic device, to perform one or more elements of the method 900. This non-transitory computer-readable media may be, for example, a memory of a base station (such as a memory 222 of a network device 218 that is a base station, as described herein).

Embodiments contemplated herein include an apparatus comprising logic, modules, or circuitry to perform one or more elements of the method 900. This apparatus may be, for example, an apparatus of a base station (such as a network device 218 that is a base station, as described herein).

Embodiments contemplated herein include an apparatus comprising: one or more processors and one or more computer-readable media comprising instructions that, when executed by the one or more processors, cause the one or more processors to perform one or more elements of the method 900. This apparatus may be, for example, an apparatus of a base station (such as a network device 218 that is a base station, as described herein).

Embodiments contemplated herein include a signal as described in or related to one or more elements of the method 900.

Embodiments contemplated herein include a computer program or computer program product comprising instructions, wherein execution of the program by a processing element is to cause the processing element to carry out one or more elements of the method 900. The processor may be a processor of a base station (such as a processor(s) 220 of a network device 218 that is a base station, as described herein). These instructions may be, for example, located in the processor and/or on a memory of the base station (such as a memory 222 of a network device 218 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A repeater device, comprising:
    one or more antennas configured to perform wireless communications;
    a transceiver coupled to the one or more antennas; and
    a processor coupled to the transceiver and configured to cause the repeater device to:
        determine a first coverage region with a first index such that a first beam between the repeater device and a network device falls within the first coverage region, wherein the first beam corresponds to
        a transmission beam for transmission to the network device via a control link or a backhaul link between the repeater device and the network device,
        a reception beam for reception from the network device via the control link or the backhaul link between the repeater device and the network device, or
        both the transmission beam and the reception beam;
        determine, based on the first coverage region, an index for each of one or more coverage regions configured to respectively indicate a beam direction for an access link of the repeater device, wherein the index is in a sequential order with respect to the first index; and
        direct multiple access link beams within a second coverage region of the one or more coverage regions for communication with a user equipment.

2. The repeater device of claim 1, wherein the first beam is determined based on a beam management procedure between the repeater device and the network device.

3. The repeater device of claim 1, wherein the first beam is determined based on an initial setup of the repeater device.

4. The repeater device of claim 1, wherein a quantity of the one or more coverage regions is determined based on a capability of the repeater device and communicated by the network device, and the one or more coverage regions are formed such that any neighbors of the one or more coverage regions are spaced substantially equally.

5. The repeater device of claim 4,
    wherein the processor is further configured to cause the repeater device to activate the second coverage region based on an index of the second coverage region received from the network device, and
    wherein the processor is further configured to cause the repeater device to activate the one or more coverage regions separately or in a periodic sweeping manner, and activation durations for the one or more coverage regions are the same or different.

6. The repeater device of claim 5, wherein the multiple access link beams are directed within the second coverage region based on a beam configuration associated with the second coverage region.

7. The repeater device of claim 6, wherein at least one of the quantity of the one or more coverage regions, the index of the second coverage region, or the beam configuration is hard-coded on the repeater device or is semi-statically or dynamically configured by the network device via at least one of:
    an RRC signaling;
    a MIB;
    a SIB;
    a MAC CE; or
    a DCI.

8. The repeater device of claim 6, wherein the first coverage region is implemented as a beam wider than the first beam, and/or the second coverage region is implemented as a beam wider than any of the multiple access link beams.

9. The repeater device of claim 8, wherein, for a second beam of the multiple access link beams within the second coverage region, the processor is further configured to cause the repeater device to:
    indicate an index of a source coverage region, in addition to an index of a source reference signal, in a corresponding TCI state, wherein the source reference signal comprises at least one of an SSB or a CSI-RS; and
    indicate a type of QCL in the corresponding TCI state, wherein the type of QCL is QCL Type-D.

10. The repeater device of claim 6, wherein at least one of the quantity of the one or more coverage regions, the index of the second coverage region, or the beam configuration is included in a side control information transmitted over the control link.

11. The repeater device of claim 1, wherein, for a second beam of the multiple access link beams within the second coverage region, the processor is further configured to cause the repeater device to identify the second beam based on a DCI from the network device, wherein the DCI indicates an index of the second coverage region and an index of the second beam via a single DCI code point or via separate DCI code points.

12. The repeater device of claim 1, wherein the processor is further configured to cause the repeater device to provide a capability of the repeater device to the network device, and wherein the capability comprises information indicating at least one of:

a total number of coverage regions per frequency range;

whether the repeater device supports separate configuration for horizontal coverage regions and/or separate configuration for vertical coverage regions;

a number of horizontal and/or vertical coverage regions per frequency range;

whether the repeater device supports a coverage region based beamforming; or a number of beams within at least one coverage region per frequency range.

13. The repeater device of claim 1, wherein the processor is further configured to cause the repeater device to obtain multiple TCI states from a TCI state index, wherein the multiple TCI states comprise:

at least one TCI state for a PDCCH from the network device to the repeater device;

at least one TCI state for a PDSCH from the network device to the repeater device;

at least one TCI state for a PUCCH from the repeater device to the network device;

at least one TCI state for a PUSCH from the repeater device to the network device;

at least one TCI state for a downlink forwarding from the repeater device to the user equipment; and/or at least one TCI state for an uplink reception at the repeater device from the user equipment.

14. The repeater device of claim 1, wherein the processor is further configured to cause the repeater device to obtain multiple TCI states from a TCI state index, wherein the multiple TCI states are determined from a joint TCI indication and comprise:

at least one joint TCI state for a PDCCH from the network device to the repeater device, a PDSCH from the network device to the repeater device, a PUCCH from the repeater device to the network device, and a PUSCH from the repeater device to the network device; and/or at least one joint TCI state for a downlink forwarding from the repeater device to the user equipment, and an uplink reception at the repeater device from the user equipment.

15. A network device, comprising:

one or more antennas configured to perform wireless communications;

a transceiver coupled to the one or more antennas; and a processor coupled to the transceiver and configured to cause the network device to:

determine a first coverage region of a repeater device with a first index such that a first beam between the network device and the repeater device falls within the first coverage region, wherein the first beam corresponds to a transmission beam for transmission to the repeater device via a control link or a backhaul link between the repeater device and the network device, a reception beam for reception from the repeater device via the control link or the backhaul link between the repeater device and the network device, or both the transmission beam and the reception beam; and provide, to the repeater device and based on a capability of the repeater device, a quantity of one or more coverage regions each with an index in a sequential order with respect to the first index, wherein the one or more coverage regions correspond to respective wider directions for determining multiple beams that are configured for communicating with a user equipment via an access link of the repeater device.

16. The network device of claim 15, wherein the first beam is determined based on a beam management procedure between the repeater device and the network device.

17. The network device of claim 15, wherein the first beam is determined based on an initial setup of the repeater device.

18. The network device of claim 15, wherein the processor is further configured to cause the network device to provide an index of a second coverage region of the one or more coverage regions, to the repeater device for activating the second coverage region, or wherein the processor is further configured to cause the network device to activate the one or more coverage regions separately or in a periodic sweeping manner, and activation durations for the one or more coverage regions are the same or different.

19. The network device of claim 18, wherein the processor is further configured to cause the network device to provide configurations of beams associated with at least one of the one or more coverage regions, wherein at least one beam configuration is either associated with a specific coverage region or associated with a group of coverage regions.

20. The network device of claim 19, wherein the processor is further configured to cause the network device to semi-statically or dynamically configure at least one of the quantity of the one or more coverage regions, the index of the second coverage region, or the beam configuration via at least one of:

an RRC signaling;

a MIB;

a SIB;

a MAC CE; or a DCI.

21. The network device of claim 18, wherein the first coverage region is implemented as a beam wider than the first beam, and/or the second coverage region is implemented as a beam wider than any of the multiple beams.

22. The network device of claim 18, wherein, for a second beam of the multiple beams within the second coverage region, the processor is further configured to cause the network device to:

indicate an index of a source coverage region, in addition to an index of a source reference signal, in a corresponding TCI state, wherein the source reference signal comprises at least one of an SSB or a CSI-RS; and indicate a type of QCL in the corresponding TCI state, wherein the type of QCL is QCL Type-D.

23. The network device of claim 18, wherein, for a second beam of the multiple beams within the second coverage region, the processor is further configured to cause the network device to indicate the second beam of the multiple beams to the repeater device with a DCI, wherein the DCI indicates an index of the second coverage region and an index of the second beam via a single DCI code point or via separate DCI code points.

24. The network device of claim 18, wherein the processor is further configured to cause the network device to obtain the capability of the repeater device from the repeater device.

25. The network device of claim 18, wherein the quantity of one or more coverage regions and the index of a second coverage region are included in a side control information transmitted over the control link.

26. The network device of claim 15, wherein the processor is further configured to cause the network device to provide multiple TCI states via a TCI state index, wherein the multiple TCI states comprise:

at least one TCI state for a PDCCH from the network device to the repeater device;

at least one TCI state for a PDSCH from the network device to the repeater device;

at least one TCI state for a PUCCH from the repeater device to the network device;

at least one TCI state for a PUSCH from the repeater device to the network device;

at least one TCI state for a downlink forwarding from the repeater device to the user equipment; and/or at least one TCI state for an uplink reception at the repeater device from the user equipment.

27. The network device of claim 15, wherein the processor is further configured to cause the network device to provide multiple TCI states via a TCI state index, wherein the multiple TCI states are provided in a joint TCI indication and comprise:

at least one joint TCI state for a PDCCH from the network device to the repeater device, a PDSCH from the network device to the repeater device, a PUCCH from the repeater device to the network device, and a PUSCH from the repeater device to the network device; and/or at least one joint TCI state for a downlink forwarding from the repeater device to the user equipment, and an uplink reception at the repeater device from the user equipment.

28. A method for communication by a repeater device, comprising:

determining a first coverage region such that a first beam between the repeater device and a network device falls within the first coverage region, wherein the first beam corresponds to a transmission beam for transmission to the network device via a control link or a backhaul link between the repeater device and the network device, a reception beam for reception from the network device via the control link or the backhaul link between the repeater device and the network device, or both the transmission beam and the reception beam;

determining, based on the first coverage region, one or more coverage regions configured to respectively indicate a beam direction for an access link of the repeater device;

receiving downlink control information (DCI) indicating an index of a second coverage region of the one or more coverage regions and indices of multiple access link beams within the second coverage region; and directing the multiple access link beams for communication with a user equipment.

\* \* \* \* \*